(12) United States Patent
Halter et al.

(10) Patent No.: US 7,283,488 B2
(45) Date of Patent: Oct. 16, 2007

(54) J1850 APPLICATION SPECIFIC INTEGRATED CIRCUIT (ASIC) AND MESSAGING TECHNIQUE

(75) Inventors: Richard A. Halter, Warren, MI (US); John M. McCambridge, Northville, MI (US)

(73) Assignee: Chrysler LLC, Auburn Hills, MI (US)

( * ) Notice: Subject to any disclaimer, the term of this patent is extended or adjusted under 35 U.S.C. 154(b) by 332 days.

(21) Appl. No.: 10/682,769

(22) Filed: Oct. 9, 2003

(65) Prior Publication Data

US 2004/0071097 A1 Apr. 15, 2004

Related U.S. Application Data

(63) Continuation of application No. 09/201,098, filed on Nov. 30, 1998, now abandoned.

(51) Int. Cl.
*H04B 1/56* (2006.01)
*H04L 5/14* (2006.01)

(52) U.S. Cl. ........................... 370/276; 370/294

(58) Field of Classification Search ............... 370/282, 370/276, 294, 257, 449, 451, 458, 474–475
See application file for complete search history.

(56) References Cited

U.S. PATENT DOCUMENTS

| | | |
|---|---|---|
| 4,622,551 A | 11/1986 | Kupersmith et al. |
| 4,677,308 A | 6/1987 | Wroblewski et al. |
| 4,706,082 A | 11/1987 | Miesterfeld et al. |
| 4,719,458 A | 1/1988 | Miesterfeld et al. |
| 4,736,367 A | 4/1988 | Wroblewski et al. |
| 4,739,323 A | 4/1988 | Miesterfeld et al. |
| 4,739,324 A | 4/1988 | Miesterfeld et al. |
| 4,742,349 A | 5/1988 | Miesterfeld et al. |
| 4,870,564 A | 9/1989 | Ketelhut et al. |
| 5,274,636 A | 12/1993 | Halter et al. |
| 5,305,355 A | 4/1994 | Go et al. |
| 5,337,042 A | 8/1994 | Hormel et al. |
| 5,363,405 A | 11/1994 | Hormel |
| 5,418,526 A | 5/1995 | Crawford |
| 5,418,720 A | 5/1995 | Randel |

(Continued)

FOREIGN PATENT DOCUMENTS

EP 0511 794 A1 4/1992

(Continued)

OTHER PUBLICATIONS

Auto-Busse fur Sensor-Aktor-Vernetzung, Prof. Dr.-Ing. Wolfhard Lawrenz, radio fernsehen elektronic, pp. 584-589, 2001.

*Primary Examiner*—Kevin C. Harper
(74) *Attorney, Agent, or Firm*—Ralph E. Smith

(57) ABSTRACT

A communication system for controlling remote devices within a vehicle is provided. The communication system includes a master module for generating a command message, and a remote module for executing the command message and generating a response message. A data bus provides bidirectional communication between the master module and the remote module. The communication system also includes a message frame for communicating data between the master module and the remote module, the message frame includes the command message generated by the master module for execution by the remote module, and the message frame includes the response message generated by the remote module for providing feedback to the master module.

22 Claims, 3 Drawing Sheets

U.S. PATENT DOCUMENTS

| | | |
|---|---|---|
| 5,432,817 A | 7/1995 | Hormel et al. |
| 5,446,910 A | 8/1995 | Kennedy et al. |
| 5,448,561 A * | 9/1995 | Kaiser et al. ............... 370/471 |
| 5,455,907 A | 10/1995 | Hess et al. |
| 5,469,150 A | 11/1995 | Sitte |
| 5,481,456 A | 1/1996 | Ogura |
| 5,483,230 A | 1/1996 | Mueller |
| 5,495,469 A | 2/1996 | Halter et al. |
| 5,508,689 A | 4/1996 | Rado et al. |
| 5,528,754 A | 6/1996 | Okamoto |
| 5,540,092 A * | 7/1996 | Handfield et al. ......... 73/146.5 |
| 5,555,425 A | 9/1996 | Zeller et al. |
| 5,579,299 A | 11/1996 | Halter et al. |
| 5,613,074 A | 3/1997 | Galloway |
| 5,619,659 A | 4/1997 | Kikinis et al. |
| 5,701,418 A | 12/1997 | Luije |
| 5,724,614 A | 3/1998 | Garland et al. |
| 5,748,675 A | 5/1998 | Hormel et al. |
| 5,768,625 A | 6/1998 | Muramatsu et al. |
| 5,835,873 A | 11/1998 | Darby et al. |
| 5,881,063 A | 3/1999 | Bament et al. |
| 5,936,520 A | 8/1999 | Luije et al. |
| 5,957,985 A | 9/1999 | Wong et al. |
| 6,031,823 A | 2/2000 | Hormel et al. |
| 6,075,460 A | 6/2000 | Minissale et al. |
| 6,254,201 B1 * | 7/2001 | Lesesky et al. ........ 303/122.02 |
| 6,529,124 B2 * | 3/2003 | Flick ....................... 340/426.1 |
| 2002/0038324 A1 * | 3/2002 | Page et al. .................. 708/300 |
| 2002/0067256 A1 * | 6/2002 | Kail .......................... 340/539 |

FOREIGN PATENT DOCUMENTS

FR               2 724 742 A1     9/1994

* cited by examiner

FIG - 3

J1850 I/O Message Strategy
3 Bit Sub ID = 8 Unique Messages

| SUB ID | | |
|---|---|---|
| 000 | Msg 0 (output): | Msg: 13 bits of output control<br>IFR: 13 corresponding output status bits |
| 001 | Msg 1 (output): | Msg: 13 bits of output control<br>IFR: 13 corresponding output status bits |
| 010 | Msg 2 (status): | This Msg could be used for diagnostic feedback |
| 011 | Msg 3 (input): | Msg: 13 bits of unused<br>IFR: 16 bits of comparator data (2 bits/input) |
| 100 | Msg 4 (input): | Msg: 13 bits of unused<br>IFR: 16 bits of comparator data (2 bits/input) |
| 101 | Msg 5 (input): | Msg: 13 bits of unused<br>IFR: 16 bits of dedicated input signals |
| 110 | Msg 6 (SPI): | Msg: 13 bits of SPI config and data<br>IFR: 16 bits of SPI data |
| 111 | Msg 7 (SPI A/D): | Msg: 13 bits A/D chan sel, config, freq, CS bits<br>IFR: 16 available bits of data |

J1850 APPLICATION SPECIFIC INTEGRATED CIRCUIT (ASIC) AND MESSAGING TECHNIQUE

CROSS REFERENCE TO RELATED APPLICATIONS

This is a continuation of U.S. Ser. No. 09/201,098 for "J1850 Application Specific Integrated Circuit (ASIC) and Messaging Technique" filed Nov. 30, 1998 now abandoned.

BACKGROUND OF THE INVENTION

1. Technical Field

The present invention generally relates to an application specific integrated circuit (ASIC) design and a messaging technique. More particularly, the present invention is directed to an ASIC design which eliminates the need for a microprocessor, and a message frame design and messaging technique for controlling remote devices which are connected to an SAE J1850 serial communication data bus within an automotive vehicle.

2. Discussion

Automotive vehicles are commonly equipped with multiple-access serial data communications networks to enable data transfer between various electronic components within the vehicle. The Society of Automotive Engineers (SAE) has established the J1850 class data communications network which has become widely accepted throughout the automotive industry. The J1850 standard is a set of technical requirements and parameters which specify the use of symbols for communicating serial data over a one or two-wire communications bus.

The J1850 protocol is based on a medium-speed (Class B) serial multiplex communication protocol for use in automotive vehicles. Serial multiplex communication (MUX) is a method of reducing wiring requirements while increasing the amount and type of data which may be shared between various electronic components connected to the communication network. This technique is achieved by connecting each component, or node, to a serial bus, consisting of either a single wire or a twisted pair of wires. Each node collects whatever data is useful to itself or other nodes (i.e. wheel speed, engine rpm, oil pressure, etc.), and then transmits this data onto the J1850 bus, where any other node which needs this data can receive it. The result of data sharing is reduced wiring and eliminating the need for redundant sensing systems.

In one exemplary implementation, one or more microprocessor based controllers are positioned throughout the vehicle and communicate with each other along the J1850 data bus. Each controller will periodically transmit information in the form of message data organized into a single message frame. This transmission can take place once the controller determines that the data bus is free. Once this message frame is transmitted onto the J1850 bus, this information is available to either a specific node, such as another controller, or all of the nodes on the data bus depending on the type of messaging scheme implemented.

An additional feature of the J1850 protocol allows one or more of the nodes to respond to the original data message within the same message frame (i.e. within a short period of time after receiving the original message, but before another node begins transmitting a new message frame). Within the J1850 protocol, this is referred to as an "in-frame response" (IFR). Accordingly, the J1850 protocol design provides a single wire network through which information can be exchanged between various controllers connected to the data bus. For example, the engine controller and the transmission controller may exchange information via the J1850 data bus concerning real-time operating or performance conditions of their associated systems.

The current J1850 system is limited to broadcasting data, and is not designed for the transmission of specific executable commands to the remote nodes on the data bus. However, rather than just broadcasting or exchanging information, it is desirable to use a messaging scheme on the J1850 bus in which a message containing a specific command is sent by the controller to a receiving node for controlling or executing various operations performed by the receiving node. Once the message is received and the command executed, the receiving node may respond using the in-frame response as to whether the command was successfully executed, or the outcome of the command execution. Currently, the aforementioned control and feedback technique is not implemented.

Accordingly, it is desirable to provide a messaging scheme which allows executable command information to be contained within a message frame, and allow a receiving node to provide an in-frame response within the same message frame as feedback to the controller. Further, it is desirable to provide a receiving node for performing various control functions in response to the command information contained within the message frame. It is also desirable to provide a sub ID scheme which allows a receiving node to identify the type of executable command information, or the type of command message contained within the message frame. Moreover, it is desirable to provide a receiving node which eliminates the need for a microprocessor, and thus the need for writing and testing additional computer code for operating the microprocessor. Finally, it is contemplated that the receiving node may also communicate with various smart drivers connected to the receiving node for controlling various electrical components, and gathering feedback data from the electrical components.

SUMMARY OF THE INVENTION

The present invention is directed to a communication system for controlling remote devices within a vehicle. The communication system includes a master module for generating a command message, and a remote module for executing the command message and generating a response message. A data bus provides bidirectional communication between the master module and the remote module. The communication system also includes a message frame for communicating data between the master module and the remote module, the message frame includes the command message generated by the master module for execution by the remote module, and the message frame includes the response message generated by the remote module for providing feedback to the master module.

BRIEF DESCRIPTION OF THE DRAWINGS

Additional objects, advantages and features of the present invention will become apparent from the following description and appended claims, taken in conjunction with the accompanying drawings in which:

FIG. 3 is a table of a particular messaging scheme also in accordance with the preferred embodiment of the present invention.

DETAILED DESCRIPTION OF THE PREFERRED EMBODIMENT

Figure 1:
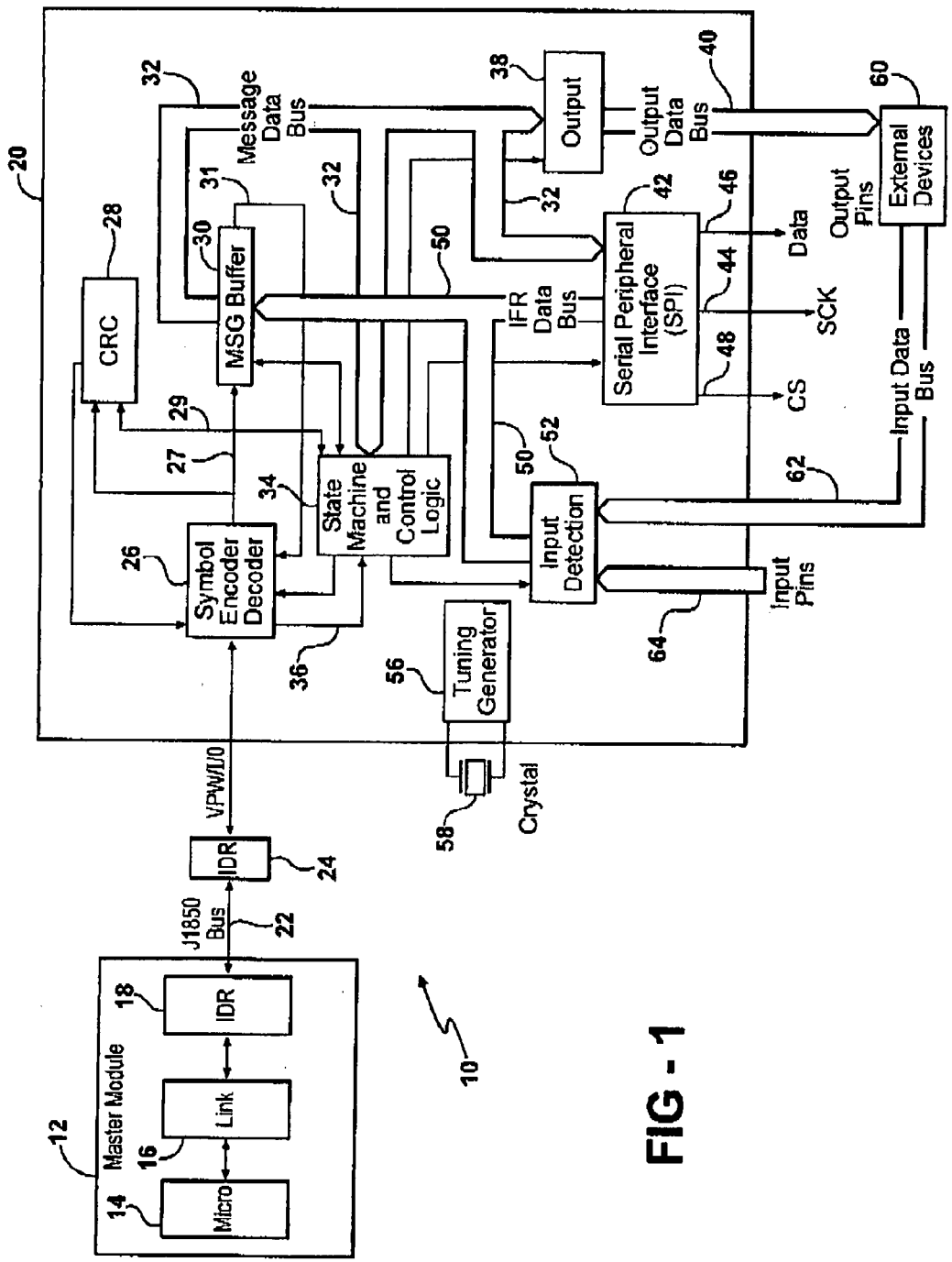
FIG. 1 is a block diagram showing the communication hardware for implementing the messaging technique of the present invention.

Referring now to FIG. 1, the application specific integrated circuit (ASIC) design for implementing the messaging technique of the present invention is shown. The communication hardware 10 includes a processor based master module or controller module 12 and an ASIC I/O module 20, which communicate with each other using a standard SAE J1850 data bus 22. A particular advantage is that the ASIC I/O module 20 does not require a microprocessor to perform its control functions. Accordingly, the step of writing and testing additional computer code for the ASIC I/O module is eliminated which significantly reduces the implementation cost of the present invention.

The controller module 12 is a processor based module located within the vehicle, such as the engine control module or the body control module. The controller module 12 contains a microprocessor 14 along with a link chip or J1850 PCI chip 16 and an integrated driver receiver (IDR) chip 18, along with other associated circuitry (not shown) for implementing the desired master control functions. The IDR chip 18 converts between the voltage levels of the PCI chip 16 and the signal levels utilized by the J1850 data bus 22. The preferred link chip 16 is the HIP 7010, and the preferred IDR chip 18 is the HIP 7020, both manufactured by Harris Semiconductor. The controller module 12 is wired into the vehicle and connected to the J1850 data bus 22, which in the preferred embodiment consists of a single wire. The controller module 12 may also include additional inputs and outputs which can communicate with other external devices not associated with the present invention. It should also be noted that additional nodes other than ASIC I/O module 20 may also be connected to the J1850 data bus 22.

The J1850 ASIC I/O module 20 is contained within an electronics module or housing, and is located remotely from the controller module 12. The controller module 12 delegates the command execution and monitoring responsibility to the ASIC I/O module 20, and receives feedback concerning the status of the commands executed by the I/O module 20. As will be appreciated from the following hardware description, the ASIC I/O module 20 does not require a microprocessor.

Figure 2:
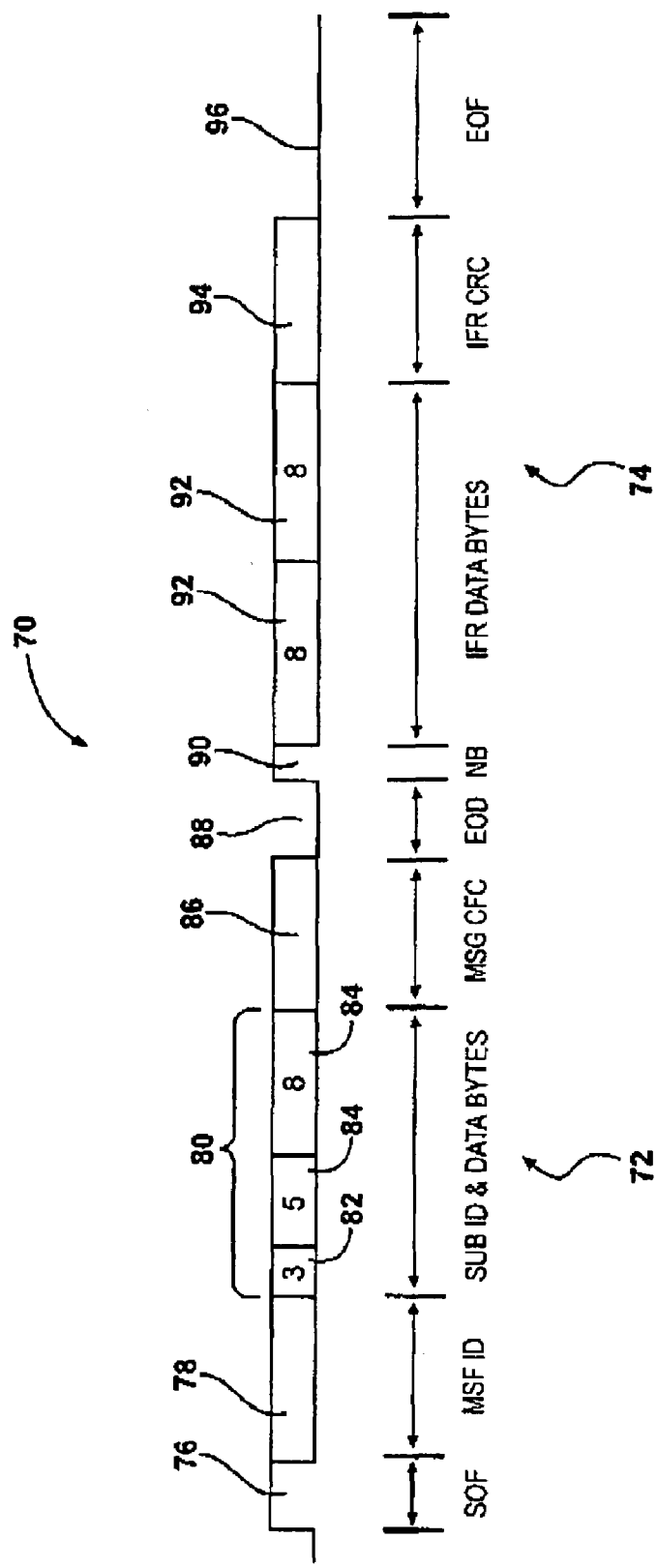
FIG. 2 is a diagram of the message frame structure in accordance with a preferred embodiment of the present invention.

The data bus 22 enters the I/O module 20 and connects to another IDR chip 24. The IDR chip 24 is identical to IDR chip 18 and converts the voltage levels from the J1850 data bus 22 to logic levels that can be read by the symbol encoder decoder (SED) block 26 within the J1850 I/O module 20. The SED block 26 detects the start of frame (SOF) 76 and idle states 96 by analyzing the incoming message frame 70 (FIG. 2). The SED block 26 also generates the normalization bit 90 and the end of frame (EOF) 96 for transmission back onto the data bus 22 during an in-frame response (IFR). The details of the IFR are discussed in greater detail below.

A cyclic redundancy check (CRC) block 28 is in operation during the reception of a message frame 70 from the data bus 22 to determine whether there are errors in the reception of the message frame. The CRC block 28 monitors the incoming serial data through the SED block 26, and can communicate the presence of errors back to the state machine 34 via line 29. A timing generator block 56 is driven in association with a crystal oscillator 58 and provides a square wave logic signal at a predetermined frequency to provide a time base for all of the synchronous functions within the J1850 ASIC I/O module 20.

The message buffer block 30 converts the incoming serial data from SED block 26 via serial line 27 into a byte format and places the converted data onto the message data bus 32. The message buffer block 30 may also receive the parallel data from the IFR data bus 50 provided by either the SPI block 42 or the input detection block 52, and route this data as necessary. As part of the present design, the message buffer block 30 can convert the parallel data bytes from IFR data bus 50 into serial data and route the serial data stream back to the SED block 26 via serial data line 31, and subsequently out onto the J1850 data bus 22.

The state machine and control logic block 34 receives signals on line 36 from the SED block 26 and uses the signals to determine the specific timing required to form bytes from the serial bit stream, and generate the appropriate timing to allow latching of the sub ID 82 that is embedded in the message frame 70. The sub ID latching function is performed internally within the state machine and control logic block 34 for generating the correct sub ID 82 read from the message frame 70.

The output block 38 receives data from the message data bus 32 and directs this data in the form of a command via output data bus 40 to various external devices 60 to be controlled according to the direction set by the sub ID latch function within the control logic block 34. As shown, these external devices 60 can provide feedback along parallel input data bus 62 and back into the ASIC I/O module 20. It is contemplated that these external devices 60 could be switched systems, such as the windshield wiper motor, the windshield washer pump, or the running lights and headlights. If these switched systems are functioning properly after receiving a command, one signal can be transmitted on the input data bus 62. If these switched systems are not functioning properly after receiving a command, a different signal can be transmitted on the input data bus 62.

The serial peripheral interface (SPI) block 42 is a circuit found on many microcontrollers such as the Motorola MC68332, MC68HC11, MC6805 etc. The SPI block 42 generates a synchronous clock (SCK) signal 44 to an external device or support chip. Data is then transmitted or received on the data line 46 coincident with the SCK signal 44. Thus, the SPI block 42 can communicate with external devices which have an A/D converter, and can also communicate with other remote SPI based devices. The chip select (CS) line 48 is a chip select function which can be used in concert with the supporting chips to determine which external support chip is being addressed by the SPI block 42. The SPI block 42 also functions to form byte wide data from the bits received on the data line 46 and places this data on the in-frame response (IFR) data bus 50 in preparation for transmission by the ASIC I/O module 20 and onto the J1850 data bus 22.

The input detection block 52 accepts data in the form of switch detection or logic inputs from the external devices 60. The inputs to the input detection block 52 are status signals from the external devices 60 that indicate whether there is an open, short or normal operation on the selected switched system. This in turn represents the status of whether the command was successfully executed, or if a problems exists after the command was asserted. The input detection block is also connected to a series of input pins 64 which may receive signals from external logic level devices, for example, the coolant level sensor or the washer fluid level sensor. Thus, if an input pin status inquiry command is received by the I/O module, the input pins 64 can be polled for current status, and this status transmitted as part of the in-frame response as feedback data to the controller module 12.

Turning now to FIG. 2, the message frame 70 for communicating executable commands and feedback data between the controller module 12 and the ASIC I/O module 20 via J1850 data bus 22 is shown. The message frame 70 includes a command message structure 72 which contains the executable command data 80, and a response message structure 74 which includes the in-frame response (IFR) data 92. As defined by the SAE standards for the J1850 communication protocol, the preferred message structure for message frame 70 is the Type III in-frame response message structure, which as part of the J1850 protocol is the highest priority message, and which also ensures that only one remote module, such as the ASIC I/O module 20, responds to the message frame 70.

The message frame 70 begins with a start of frame (SOF) signal 76 in which the data bus 22 is forced high (logic level 1) for a predetermined amount of time, which signals that a message is being transmitted on the bus. A one byte message ID 78 follows the SOF signal 76. The message ID 78 is formatted with a unique code sequence associated with a particular receiving node on the J1850 data bus 22. Thus, as part of the present invention, the I/O module 20 will only receive and store message frames 70 which contain the designated unique code within the message ID 78.

A two byte command message 80 carries the executable command data associated with a unique feature of the present invention. In the preferred embodiment, the command message 80 includes a three bit sub ID 82 and thirteen bits of command message data 84 which contains the executable commands which are communicated from the controller module 12 to the ASIC I/O module 20. As part of the present invention, the three bit sub ID 82 provides eight unique binary codes which correspond to up to eight separate messages and eight separate message targets within the I/O module 20.

The command message 80 is followed by a one byte message CRC 86 which is used for the error checking protocol. The command message structure 72 portion of the message frame 70 terminates with an end of data (EOD) signal 88 in which the data bus 22 is forced low (logic level 0).

The response message structure 74 is initiated by the remote node (such as ASIC I/O module 20) by a normalization bit (NB) signal 90 in which the data bus 22 is forced high (logic level 1) for a predetermined amount of time. The NB signal 90 is followed by a two byte IFR data message 92. As part of the present invention, the IFR data message 92 carries response and/or feedback data from the ASIC I/O module to the controller module 12. The information within the IFR data message 92 is generated from the SPI block 42, the input detection block 52, or may be generated as diagnostic or self test information from within the I/O module 20. The IFR data message 92 is followed by a one byte IFR CRC 94 which is also used for the error checking protocol. The in-frame response 92 and the response message structure 74 terminates with and end of frame (EOF) signal in which the data bus 22 is forced low (logic level 0) for a predetermined amount of time to signal that the in-frame response is complete, and that the data bus is free for use by another transmitting node.

With reference to FIG. 3, a table discloses the messaging scheme of the present invention. While the preferred eight messages are shown, more or less than eight messages are within the scope of the present invention, and can be achieved by modifying the number of sub ID bits 82. A particular advantage of the present invention is that specific executable commands can be transmitted from the controller module 12 to the I/O module 20 for execution. In response, the I/O module 20 can return feedback data to the controller module 12 by formatting this data within the in-frame response data bytes 92. Thus, the executable command, and the response to the command take place within the same message frame.

In operation, the controller module 12 formats the command message structure 72 of a message frame 70 and transmits this information as a variable pulse width modulation signal along the J1850 data bus 22 to the ASIC I/O module 20. The sub ID bits 82 are stripped off of the two byte command message 80. At this point the message is identified by the state machine and control logic block 34. If the message is message 0 (binary 000) or message 1 (binary 001), the remaining thirteen bits forming the executable command data 84 are placed onto the message data bus 32 by the message buffer 30 and routed to the output block 38. The output block then communicates the command to the external devices 60 via the output data bus 40. When the sub ID latching function identifies message 2 (binary 010), the ASIC I/O module 20 formats the IFR data message bytes 92 with diagnostic feedback representing current internal operating conditions and status of the I/O module 20.

If the sub ID 82 identifies messages 3, 4 or 5 (binary 011, 100, 101), the thirteen command data bits 84 are not routed to the message data bus 32. Instead, up to sixteen bits of input signal data from input detection block 52 are placed onto the IFR data bus 50 and routed back to the message buffer 30. It is contemplated that messages 3 and 4 are for transmitting data from input data bus 62, where two bits are used for each input signal, and message 5 is for transmitting input data received from dedicated input pins 64, where one bit is used for each input signal.

If the sub ID identifies message 6 or 7, the SPI port 42 is utilized as the I/O channel. The command data 84 of Message 7 is intended for configuring the SPI 42 for transmitting any remaining command data 84 on data line 46. In response, up to sixteen bits of data received on line 46 can be placed into the IFR data message 92. The command data 84 of message 7 is intended for configuring the SPI 42 for communicating with a serial device having an A/D converter for sampling an analog signal and transmitting a digital signal back to the SPI 42. In one exemplary implementation, a time varying voltage signal, such as the battery voltage, can be sampled, and this data returned to the SPI 42. The SPI can then format the IFR data message 92 with the digitized voltage signal which is then transmitted to the controller module 12 during the in-frame response.

The foregoing discussion discloses and describes exemplary embodiments of the present invention. One skilled in the art will readily recognize from such discussion, and from the accompanying drawings and claims, that various changes, modifications, and variations can be made therein without departing from the spirit and scope of the invention as defined in the following claims.

What is claimed is:

1. A communication system for controlling a remote device within a vehicle comprising:
   a master module for generating a command message;
   a remote module for executing the command message and generating a response message in response to executing the command message, the remote module being connected to the remote device;

a data bus for providing bidirectional communication between the master module and the remote module;

a message frame for communicating data between the master module and the remote module, the message frame including the command message generated by the master module for execution by the remote module, and the message frame including the response message generated by the remote module for providing feedback to the master module.

2. The communication system of claim 1 wherein the master module is a controller associated with the vehicle, the controller having a microprocessor and an interface for connecting to the data bus.

3. The communication system of claim 1 wherein the remote module is an ASIC I/O module having a state machine for controlling logic functions executed within the I/O module, the I/O module having an interface for connecting to the data bus.

4. The communication system of claim 1 wherein the data bus is a J1850 data bus.

5. The communication system of claim 1 wherein the command message comprises a two byte message.

6. The communication system of claim 1 wherein the command message includes a sub ID and an executable string of data bits.

7. The communication system of claim 6 wherein the sub ID comprises three data bits included within The two byte message.

8. The communication system of claim 6 wherein the executable string of data bits comprises thirteen data bits.

9. The communication system of claim 6 wherein The executable string of data bits includes configuration data for configuring a data port located within the remote module.

10. A multiplexed communication system for controlling remote devices within a vehicle comprising:
    a master module having a processor and a communication port;
    a remote I/O module having a state machine and a plurality of communication ports;
    a J1850 data bus for providing bidirectional communication between the master module and the remote I/O module; and
    a message frame for communicating data between the master module and the remote I/O module, the message frame including a control message formatted by the master module for execution by the remote module, and the message frame including a response message formatted by the remote I/O module in response to executing the command message for providing feedback to the master module;
    said control message including a sub ID and an executable string of bits;
    said response message including two bytes of feedback data.

11. The multiplexed communication system of claim 10 wherein the sub ID is a binary three bit code for identifying up to eight control messages.

12. The multiplexed communication system of claim 10 wherein the executable string of data bits is thirteen bits of command data which is transmitted by an output port located on the remote I/O module.

13. The multiplexed communication system of claim 12 wherein the output port is a parallel output port connected to a switchable external device.

14. The multiplexed communication system of claim 12 wherein the output port is a serial peripheral interface port.

15. The multiplexed communication system of claim 10 wherein the response message is an in-frame response message.

16. A multiplexed communication system for transporting an executable command message between a master control module and a remote device for executing the command message, the communication system comprising:
    a remote I/O module having a state machine and an internal data bus for processing the executable command message;
    a data bus for providing bidirectional communication between the master control module and the remote I/O module;
    a message frame for transporting the executable command message, the message frame containing command data and response data;
    the command data including a sub ID portion for identifying the remote device and a command message portion for containing an executable command, the command message portion being transmitted by the remote I/O module to the remote device;
    the response data including a response message formatted by the remote I/O module in response to executing the command message and transmitted by the remote I/O module to the master control module within a predetermined amount of time after receiving the command data.

17. The multiplexed communication system of claim 16 wherein the command message and the response message are communicated within one message frame.

18. The multiplexed communication system of claim 16 wherein the remote I/O module includes an output data bus for communicating the command message to the remote device.

19. The multiplexed communication system of claim 16 wherein the remote I/O module includes a serial peripheral interface for communicating with a remote serial device.

20. The multiplexed communication system of claim 16 wherein the remote I/O module includes an input data bus for receiving signals from the remote device.

21. The multiplexed communication system of claim 10 wherein the remote I/O module comprises an ASIC.

22. The multiplexed communication system of claim 16 wherein the remote I/O module comprises an ASIC.

* * * * *